US012242270B2

(12) United States Patent
Pu et al.

(10) Patent No.: US 12,242,270 B2
(45) Date of Patent: Mar. 4, 2025

(54) METHOD AND SYSTEM FOR CONTROLLING MULTI-UNMANNED SURFACE VESSEL COLLABORATIVE SEARCH

(71) Applicants: Shanghai University, Shanghai (CN); Chongqing University, Chongqing (CN)

(72) Inventors: Huayan Pu, Shanghai (CN); Yuan Liu, Shanghai (CN); Jun Luo, Chongqing (CN); Zhijiang Xie, Chongqing (CN); Xiaomao Li, Shanghai (CN); Jiajia Xie, Shanghai (CN); Zhou Su, Shanghai (CN); Yan Peng, Shanghai (CN); Shaorong Xie, Shanghai (CN)

(73) Assignees: Shanghai University, Shanghai (CN); Chongqing University, Chongqing (CN)

( * ) Notice: Subject to any disclaimer, the term of this patent is extended or adjusted under 35 U.S.C. 154(b) by 797 days.

(21) Appl. No.: 17/469,155

(22) Filed: Sep. 8, 2021

(65) Prior Publication Data

US 2022/0214688 A1  Jul. 7, 2022

(30) Foreign Application Priority Data

Jan. 6, 2021 (CN) .......................... 202110012855.6

(51) Int. Cl.
*G05D 1/00* (2024.01)
*B63B 79/10* (2020.01)
(Continued)

(52) U.S. Cl.
CPC .......... *G05D 1/0206* (2013.01); *B63B 79/10* (2020.01); *B63B 79/40* (2020.01); *G08G 3/02* (2013.01); *G06N 20/00* (2019.01)

(58) Field of Classification Search
None
See application file for complete search history.

(56) References Cited

U.S. PATENT DOCUMENTS

11,887,485 B2 * 1/2024 Pu .......................... B63B 79/40
12,072,705 B2 * 8/2024 Chen ...................... G05D 1/81
(Continued)

*Primary Examiner* — David P. Merlino
*Assistant Examiner* — Mahmoud M Kazimi
(74) *Attorney, Agent, or Firm* — ArentFox Schiff LLP; Michael Fainberg (57) ABSTRACT

A method and system for controlling multi-unmanned surface vessel (USV) collaborative search are disclosed which relate to the technical field of the marine intelligent USV collaborative operation. The method includes determining a task region of a USV team; determining environmental perception information corresponding to each of the USVs at the current moment according to the task region and the probability graph mode; inputting the environmental perception information corresponding to each of the USVs at the current moment into the corresponding target search strategy output model respectively to obtain an execution action of each of the USVs at the next moment; sending the execution action of each of the USVs at the next moment to a corresponding USV execution structure to search for underwater targets within the task region. The target search strategy output model is obtained by training based on a training sample and a DDQN network structure.

10 Claims, 4 Drawing Sheets

(51) Int. Cl.
  *B63B 79/40* (2020.01)
  *G06N 20/00* (2019.01)
  *G08G 3/02* (2006.01)

(56) References Cited

U.S. PATENT DOCUMENTS

2022/0197281 A1* 6/2022 Chen ........................ G06N 3/045
2022/0215758 A1* 7/2022 Pu ........................... G05D 1/692

* cited by examiner

FIG.4

METHOD AND SYSTEM FOR CONTROLLING MULTI-UNMANNED SURFACE VESSEL COLLABORATIVE SEARCH

CROSS REFERENCE TO RELATED APPLICATION

This patent application claims the benefit and priority of Chinese Patent Application No. 202110012855.6, filed on Jan. 6, 2021, the disclosure of which is incorporated by reference herein in its entirety as part of the present application.

TECHNICAL FIELD

The present disclosure relates to the technical field of the marine intelligent unmanned surface vessel (USV) collaborative operation, and specifically to a method and system for controlling multi-USV collaborative search.

BACKGROUND ART

USV, as a robot system with autonomous planning, driving function and navigation function, can be deployed in a task region through onshore transportation or carried by large ships to complete tasks independently. For example, the tasks may include environmental monitoring, sampling, search, communication, port protection, patrol, and the like. Among these tasks, the search task is one of the most appropriate tasks for the USVs.

In general, the task region needs to be monitored in terms of task requirements and environmental conditions (e.g., wind, flow, and obstacles). The extent of task region may generally be large, and accordingly, it needs to take a much longer time to complete the search for the entire task region. As a consequence, the staff has to work on the ship for a long period of time. It is well known that long-term offshore operation can be very hard and inconvenient, and may pose a threat to health and safety of the staff.

Owing to the characteristics of the USV, the search task can be independently performed for a long time in the task region without manual intervention, whereby the search efficiency is greatly improved, and the working strength and the working risk are greatly reduced. However, since the space of the USVs are mostly smaller than that of the ordinary ship, the USV cannot be equipped with some high-power observation sensors, and therefore, the sensing range of the USV is limited, which means that the search efficiency per unit time of the USV is low. In addition, once a USV has an accident (equipment failure, unavoidable obstacles, strong electromagnetic interference, to name just a few) during the performance of a task, the performance of the task has to be suspended, which may cause a negative effect for certain emergency situations (e.g., searching for victims). Although the above problems may be mitigated to a certain extent by improving the performance of the USV, the search efficiency of the individual USV is far from meeting the actual demands no matter whatever is done to improve the performance of the USV itself.

SUMMARY

An object of the present disclosure is to provide a method and system for controlling multi-USV collaborative search, and intends to solve the problems of the low efficiency, the low accuracy, the indefinite task allocation of the USV and the like, so that the USV team fully plays the advantage of USV collaborative operation.

To achieve the above object, the present disclosure provides the following solution.

A method for controlling multi-USV collaborative search includes:
  determining a task region of a USV team, where the USV team includes a plurality of USVs, each of the plurality of the USVs corresponds to one target search strategy output model, the target search strategy output model is obtained based on a training of training samples and a double deep Q-network (DDQN) network structure;
  determining environmental perception information corresponding to each of the USVs at a current moment according to the task region and a probability graph mode, where the environmental perception information includes target information, collaboration information, obstacle observation information and collision avoidance information;
  inputting the environmental perception information corresponding to each of the USVs at the current moment into a corresponding target search strategy output model respectively to obtain an execution action of each of the USVs at a next moment; and
  sending the execution action of each of the USVs at the next moment to a corresponding USV execution structure to search for underwater targets in the task region.

According to an embodiment, determining the environmental perception information corresponding to each of the USVs at the current moment according to the task region and the probability graph mode, specifically includes:
  calculating a task sub-region corresponding to each of the USVs according to the task region and a number of USVs in the USV team; and
  determining the environmental perception information collected by each of the USVs in the corresponding task sub-region at the current moment based on the probability graph mode.

According to an embodiment, determining process of the target information includes:
  establishing an xy coordinate system with one corner of the task sub-region as an origin;
  dividing the task sub-region to obtain a plurality of cells with a same size, and calculating a central position coordinate of each of the cells based on the xy coordinate system;
  determining a target existence probability of each of the cells;
  modelling each of the cells based on the target existence probability of each of the cells by employing a Bernoulli distribution probability algorithm, to obtain a target existence probability model corresponding to each of the cells;
  determining an sensing region of the USV at the current moment;
  calculating a target existence probability graph corresponding to the USV at the current moment according to the central position coordinate of each of the cells, the target existence probability model corresponding to each of the cells and the sensing region of the USV at the current moment; and
  determining the target information corresponding to the USV at the current moment according to the target existence probability graph corresponding to the USV at the current moment.

According to an embodiment, the determining process of the collaborative information includes:
  determining the collaborative information corresponding to the USV at the current moment according to the formula $C_{i,k}=\{c_{i,k,j}\in R: \|g-a_{i,k}\|\leq R_c\}$;
  where the $C_{i,k}$ represents the collaborative information of an i-th USV at a k-th moment, the $c_{i,k}$ represents the collaborative information of the i-th USV in a j-th cell at the k-th moment, the R represents a radius of the task sub-region, the $a_k$ represents a position of the i-th USV at the k-th moment, the g represents a position of the j-th cell, and the $R_c$ represents a communication radius.

According to an embodiment, the determining process of the obstacle observation information includes:
  determining the obstacle observation information corresponding to the USV at the current moment according to the formula $O_{i,k}=\{o_{i,k,j}\in R: \|a_{i,k}-O_{bstacle}\|\leq R_o\}$;
  where the $O_{i,k}$ represents the obstacle observation information of an i-th USV at a k-th moment, and the $o_{i,k,j}$ represents the obstacle observation information of the i-th USV in a j-th cell at the k-th moment, the R represents a radius of the task sub-region, the $a_{i,k}$ represents a position of the i-th USV at the k-th moment, the $O_{bstacle}$ represents a position of an obstacle, and the $R_o$ represents an obstacle avoidance radius.

According to an embodiment, the determining process of the collision avoidance information includes:
  determining the collision avoidance information corresponding to the USV at the current moment according to the formula $d_{i,k}=\{d_{i,k,j}\in R: \|g-a_{i,k}\|\leq R_d\}$;
  where the $d_{i,k}$ represents the collision avoidance information of an i-th USV at a k-th moment, and the $d_{i,k,j}$ represents the collision avoidance information of the i-th USV in a j-th cell at the k-th moment, the R represents a radius of the task sub-region, the $a_{i,k}$ represents a position of the i-th USV at the k-th moment, the g represents a position of the j-th cell, and the $R_d$ represents a collision radius.

According to an embodiment, the construction process of the target search strategy output model includes:
  determining a training sample for an i-th USV, the training sample is a data set with temporal continuity, the data set includes a plurality of sample sets, each of the sample sets includes a plurality of elements, which are respectively the environmental perception information at the current moment, the execution action at the current moment, a reward at the current moment and the environmental perception information at the next moment;
  constructing a DDQN network structure; and
  inputting the training samples of the i-th USV into the DDQN network structure for training the DDQN network structure to obtain the target search strategy output model corresponding to the i-th USV, so as to obtain the target search strategy output model corresponding to each USV.

A system for controlling multi-USV collaborative search includes:
  a task region determination module, configured to determine a task region of a USV team, where the USV team includes a plurality of USVs, each of the plurality of the USVs corresponds to one target search strategy output model, the target search strategy output model is obtained by training based on a training sample and a DDQN network structure;
  an environmental perception information determination module, configured to determine environmental perception information corresponding to each of the USVs at a current moment according to the task region and a probability graph mode, where the environmental perception information includes target information, collaboration information, obstacle observation information and collision avoidance information;
  an execution action acquisition module, configured to input the environmental perception information corresponding to each of the USVs at the current moment into the corresponding target search strategy output model respectively to obtain an execution action of each of the USVs at a next moment; and
  a target search module, configured to send the execution action of each of the USVs at the next moment to a corresponding USV execution structure to search for underwater targets in the task region.

According to an embodiment, the environmental perception information determination module specifically includes:
  a task region dividing unit, configured to calculate a task sub-region corresponding to each of the USVs according to the task region and a number of USVs in the USV team; and
  an environmental perception information determination unit, configured to determine environmental perception information collected by each USV in a corresponding task sub-region at the current moment based on the probability graph mode.

According to an embodiment, the system further includes: a target search strategy output model construction module; the target search strategy output model construction module, specifically includes:
  a training sample determination unit, configured to determine a training sample for an i-th USV, the training sample is a data set with temporal continuity, where the data set includes a plurality of sample sets, each of the sample sets includes a plurality of elements, which are respectively the environmental perception information at the current moment, the execution action at the current moment, a reward at the current moment and the environmental perception information at the next moment;
  a DDQN network structure construction unit, configured to construct the DDQN network structure; and
  a target search strategy output model construction unit, configured to input the training sample of the i-th USV into the DDQN network structure for training the DDQN network structure to obtain the target search strategy output model corresponding to the i-th USV, so as to obtain the target search strategy output model corresponding to each of the USVs.

According to the specific embodiment provided by the present disclosure, the beneficial effects of the present disclosure are summarized as follows.

The present disclosure determines the target search strategy of each of the USVs in real time by means of a probability graph mode and a DDQN algorithm, whereby the technical effect of collaborative search for underwater targets by multiple USVs is achieved.

BRIEF DESCRIPTION OF THE DRAWINGS

In order to illustrate the technical solutions in the embodiments of the present disclosure or in the prior art more clearly, the accompanying drawings required in the embodiments are introduced below briefly. Apparently, the accompanying drawings in the following description show merely some embodiments of the present disclosure, and other drawings may be obtained from these accompanying drawings by those of ordinary skill in the art without creative labor.

DETAILED DESCRIPTION OF THE EMBODIMENTS

The technical solutions in the embodiments of the present disclosure will be described below clearly and completely in combination with the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The disclosure aims to provide a method and system for controlling multi-USV collaborative search, and intends to solve the problems of inefficiency, low accuracy, indefinite task allocation of the USV and the like, so that the USV team can bring the advantages of collaborative operation of the USVs into full play.

To make the above objects, features and advantages of the present disclosure more obvious and easy to understand, the following further describes the present disclosure in detail with reference to the accompanying drawings and the specific embodiments.

A multi-unmanned aerial vehicle (UAV) system may enhance the robustness and reliability of the UAVs and provide different execution strategies for various types of tasks. Based on this, each of the USVs in the USV team can transmit information to each other and the task plan can adjusted as necessary according to the task demand. Once one of the USVs fails, the failed USV may be quickly replaced by other USVs to ensure that the task will not be interrupted during the execution. Currently, the control over the USV team still faces many challenges. Therefore, more advanced control methods are required for the USV team to enhance the collaboration capability of USVs.

In recent years, the continuous development of reinforcement learning methods has enabled a new alternative for solving the problem of target search. The nature of reinforcement learning is to learn the strategy from interactions between agents and environment. The present disclosure provides a method and system for controlling multi-USV collaborative search based on the reinforcement learning method and a probability graph method, and the method is applicable to the search tasks where multi-USV searching for multiple static underwater targets collaboratively. According to the present disclosure, an environmental perception step and a strategy generation step are included, which are organized by an architecture based on a "divide and conquer" strategy. The environmental perception step focuses on providing environmental sensing values. The strategy generation step focuses on how to learn the optimal strategy. In accordance with the method or system provided by the disclosure, the task environment is modeled, and a corresponding reward function is designed to effectively explore the task environment and the learning strategy.

Embodiment 1

Figure 1:
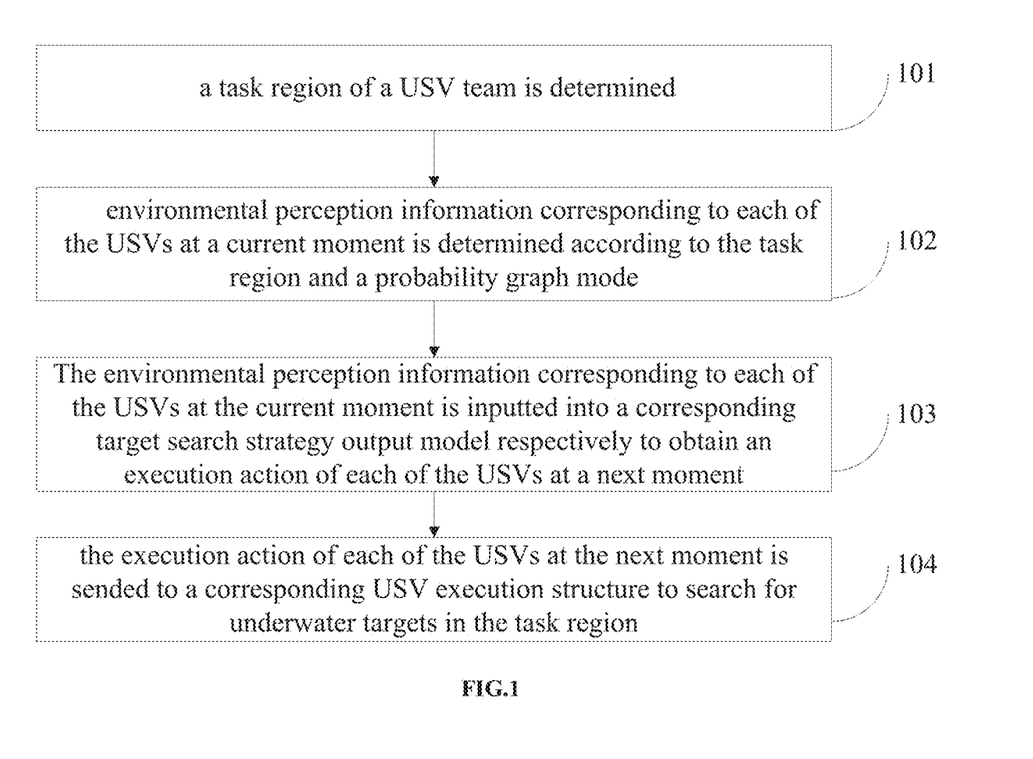
FIG. 1 is the flow chart of the method for controlling multi-USV collaborative search according to the present disclosure.

As shown in FIG. 1, the embodiment provides a method for controlling multi-USV collaborative search, which includes the following steps 101-104.

In step 101, a task region of a USV team is determined. The USV team includes multiple USVs. Each of the USVs corresponds to one target search strategy output model. The target search strategy output model is obtained by training based on a training sample and a DDQN network structure.

In step 102, environmental perception information corresponding to each of the USVs at the current moment is determined according to the task region and the probability graph mode. The environmental perception information includes target information, collaboration information, obstacle observation information and collision avoidance information.

In step 103, the environmental perception information corresponding to each of the USVs at the current moment is input into the corresponding target search strategy output model respectively to obtain an execution action of each of the USVs at the next moment.

In step 104, the execution action of each of the USVs at the next moment is sent to the corresponding USV execution structure for searching for underwater targets in the task region.

According to an embodiment, the step 102 provided by the present embodiment specifically includes:
Calculating a task sub-region corresponding to each of the USVs according to the task region and the number of USVs in the USV team; and
Determining environmental perception information collected by each of the USVs in the corresponding task sub-region at the current moment based on the probability graph mode.

The determining process of the target information includes:
Establishing an xy coordinate system with one corner of the task sub-region as an origin;
Dividing the task sub-region to obtain multiple cells with the same size, and calculating a central position coordinate of each of the cells based on the xy coordinate system;
Determining a target existence probability of each of the cells;
Modelling each of the cells based on the target existence probability of each of the cells by employing a Bernoulli distribution probability algorithm, to obtain a target existence probability model corresponding to each of the cells;
Determining an sensing region of the USV at the current moment;
Calculating a target existence probability graph corresponding to the USV at the current moment according to the central position coordinate of each of the cells, the target existence probability model corresponding to each of the cells and the sensing region of the USV at the current moment; and Determining target information corresponding to the USV at the current moment according to the target existence probability graph corresponding to the USV at the current moment.

The determining process of the collaborative information includes:

Determining collaborative information corresponding to the USV at the current moment according to the formula $C_{i,k}=\{c_{i,k,j}\in R:\|g-a_{i,k}\|\leq R_c\}$;

where $C_{i,k}$ represents the collaborative information of the i-th USV at the k-th moment, $c_{i,k,j}$ represents the collaboration information of the i-th USV in the j-th cell at the k-th moment, R represents the radius of the task sub-region, $a_{i,k}$ represents the position of the i-th USV at the k-th moment, g represents the position of the j-th cell, and $R_c$ represents the communication radius.

The determining process of the obstacle observation information includes:

Determining the obstacle observation information corresponding to the USV at the current moment according to the formula $O_{i,k}=\{o_{i,k,j}\in R:\|a_{i,k}-O_{bstacle}\|\leq R_o\}$;

where $O_{i,k}$ represents obstacle observation information of the i-th USV at the k-th moment, $o_{i,k,j}$ represents obstacle observation information of the i-th USV in the j-th cell at the k-th moment, R represents the radius of the task sub-region, $a_{i,k}$ represents the position of the i-th USV at the k-th moment, $O_{bstacle}$ represents the position of the obstacle, and $R_o$ represents the obstacle avoidance radius.

The determining process of the collision avoidance information includes:

Determining the collision avoidance information corresponding to the USV at the current moment according to the formula $d_{i,k}=\{d_{i,k,j}\in R:\|g-a_{i,k}\|\leq R_d\}$;

where $d_{i,k}$ represents collision avoidance information of the i-th USV at the k-th moment, $d_{i,k,j}$ represents collision avoidance information of the i-th USV in the j-th cell at the k-th moment, R represents the radius of the task sub-region, $a_{i,k}$ represents the position of the i-th USV at the k-th moment, g represents the position of the j-th cell, and $R_d$ represents the collision radius.

According to an embodiment, the construction process of the target search strategy output model provided by the embodiment includes:

Determining training samples for the i-th USV, where the training sample is a data set with temporal continuity, the data set includes multiple sample sets, each sample set includes multiple elements, which are respectively the environmental perception information at the current moment, the execution action at the current moment, the reward at the current moment and the environmental perception information at the next moment;

Constructing the DDQN network structure; and

Inputting the training samples of the i-th USV into the DDQN network structure for training the DDQN network structure to obtain the target search strategy output model corresponding to the i-th USV, so as to obtain the target search strategy output model corresponding to each USV.

Embodiment 2

Figure 2:
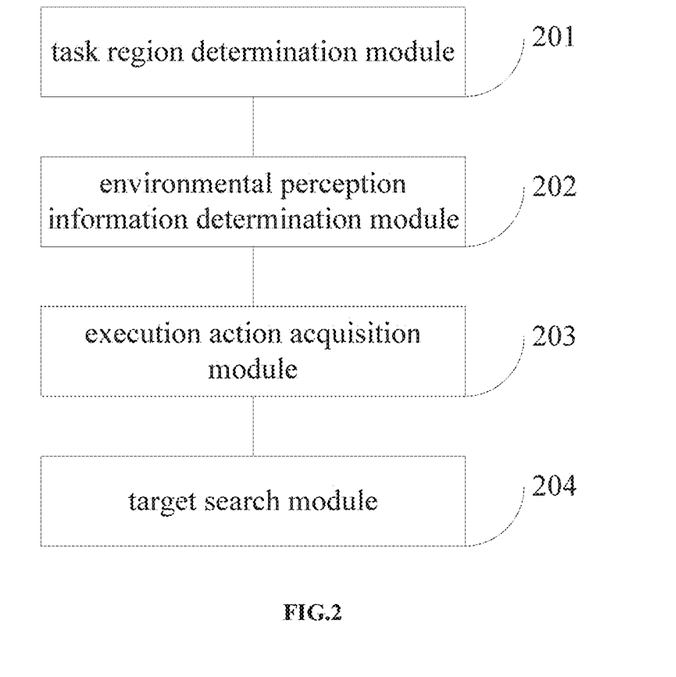
FIG. 2 is the structural schematic diagram of a system for controlling multi-USV collaborative search according to the present disclosure.

As shown in FIG. 2, the embodiment provides a system for controlling multi-USV collaborative search, which includes: a task region determination module 201, an environmental perception information determination module 202, an execution action acquisition module 203 and a target search module 204.

The task region determination module 201 is configured to determine a task region of a USV team. The USV team includes multiple USVs and each one of the USVs corresponds to one target search strategy output model. The target search strategy output model is obtained by training based on a training sample and a DDQN network structure.

The environmental perception information determination module 202 is configured to determine the environmental perception information corresponding to each of the USVs at the current moment according to the task region and a probability graph mode.

The execution action acquisition module 203 is configured to input the environmental perception information corresponding to each of the USVs at the current moment into the corresponding target search strategy output model respectively to obtain the execution action of each of the USVs at the next moment.

The target search module 204 is configured to send the execution action of each USV at the next moment to the corresponding USV execution structure to search for the underwater targets in the task region.

According to an embodiment, the environment perception information determination module 202 provided by the embodiment specifically includes a task region dividing unit and an environmental perception information determination unit.

The task region dividing unit is configured to calculate a task sub-region corresponding to each USV according to the task region and the number of USVs in the USV team;

The environmental perception information determination unit is configured to determine environmental perception information collected by each USV in the corresponding task sub-region at the current moment based on the probability graph mode.

According to an embodiment, the system provided by the embodiment further includes a target search strategy output model construction module. The target search strategy output model construction module specifically includes a training sample determination unit, a DDQN network structure construction unit and a target search strategy output model construction unit.

The training sample determination unit is configured to determine a training sample for the i-th USV. The training sample is a data set with temporal continuity which including multiple sample sets; each of the sample sets includes multiple elements, which are respectively the environmental perception information at the current moment, the execution action at the current moment, the reward at the current moment and the environmental perception information at the next moment.

The DDQN network structure construction unit is configured to construct a DDQN network structure.

The target search strategy output model construction unit is configured to input the training sample of the i-th USV into the DDQN network structure for training the DDQN network structure to obtain the target search strategy output model corresponding to the i-th USV, so as to obtain the target search strategy output model corresponding to each of the USVs.

Embodiment 3

The method for controlling multi-USV collaborative search provided by the embodiment includes the following steps 1-3.

In step 1, a sensor carried on each USV is configured to determine the environmental perception value at a k-th moment. The environmental perception value has a direct impact on whether a strategy generation step can learn an effective execution strategy. Each environmental perception value includes four parts which are target information, collaboration information, obstacle observation information and collision avoidance information.

The calculation process of the above information is as follows.

(1) Target Information

Assuming that there are N USVs in the USV team, each of the USVs moves in a task region A, $A \in R^2$, and the task region is a rectangular area with a length L and a width W.

Figure 3:
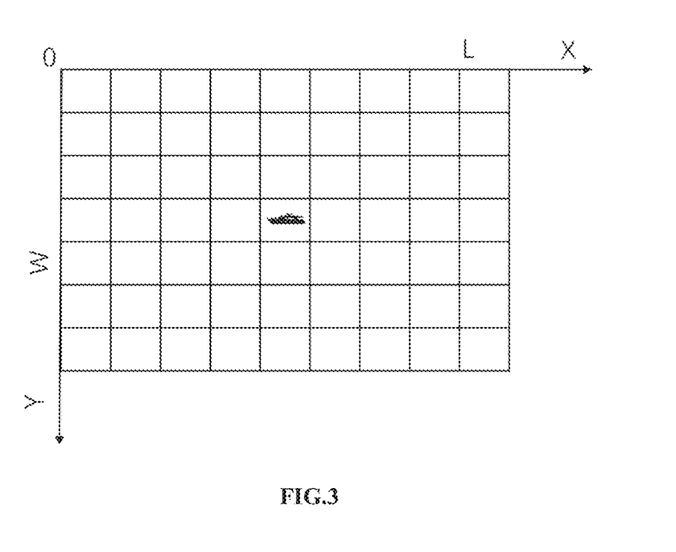
FIG. 3 is a schematic diagram of the target information according to the present disclosure.

As shown in FIG. 3, an xy coordinate system is created by taking the upper left corner of the task region A as an origin, and then the task region A is divided into multiple cells. The coordinate of the central position of each cell is represented as $g=(x,y)$, $x \in \{1, 2, \ldots, L_x\}$, $y \in \{1, 2, \ldots, W_y\}$, the total number of cells is $L_x \times W_y$, $j \in \{1, 2, \ldots, L_x \times W_y\}$. $\theta_j=1$ and $\theta_j=0$ respectively represent the presence and absence of targets in the j-th cell. At the k-th moment, the coordinates of the i-th UAV in the task region A can be denoted as $a_{i,k}$. Each of the cells is modeled by Bernoulli distribution probability method, that is, each of the cells is modeled in the form of probability $P(\theta_j=1)$ being $\theta_j=1$ and probability $1-P(\theta_j=1)$ being $\theta_j=0$.

Due to the limited observability of the USV, the i-th USV can only sample in the sensing region $s_{i,k}$ defined by the sensing radius $R_s$ at the k-th moment; where $s_{i,k}=\{g \in A: \|g-a_{i,k}\| \leq R_s\}$, and $\|*\|$ represents the l2-norm of a vector.

When the coordinate of the central position of the cell is located in the sensing region $s_{i,k}$, the cell is considered to be completely within the sensing region $s_{i,k}$. The sampling result of the sensing region $s_{i,k}$ by the i-th USV at the k moment is denoted by $z_{i,j,k}$, $z_{i,j,k}=1$ represents that the target has been detected, and $z_{i,j,k}=0$ represents that the target is not detected. Thus, $P(z_{i,j,k}=1|\theta_j=1)=d$ (detection probability) and $P(z_{i,j,k}=1|\theta_j=0)=f$ (false alarm probability) are used to model the data sampling process of the USV.

To sum up, a separate probability graph is generated for each of the USVs, for example, the probability graph for the i-th USV is $P_{i,k} \triangleq =(P_{i,j,k} \in [0, 1])$, where $P_{i,j,k}$ represents the probability that the target exists in the j-th cell for the i-th USV at the k-th moment.

The probability graph of each USV is measured and updated based on Bayesian rule, and its measurement update formula is given by the one below. An initial value of $P_{i,j,k}$ is set as 0.5, indicating the absence of information, and $P_{i,j,k}$ is updated in real time during the search.

$$\mathcal{P}_{i,j,k} = \frac{p(O_{i,j,k}|\theta_j=1)\mathcal{P}_{i,j,k-1}}{p(O_{i,j,k}|\theta_j=1)\mathcal{P}_{i,j,k-1} + p(O_{i,j,k}|\theta_j=0)(1-\mathcal{P}_{i,j,k-1})} =$$

$$\begin{cases} \frac{p_{i,d}\mathcal{P}_{i,j,k-1}}{p_{i,d}\mathcal{P}_{i,j,k-1} + p_{i,f}(1-\mathcal{P}_{i,j,k-1})}, & \text{if } O_{i,j,k}=1 \\ \frac{(1-p_{i,d})\mathcal{P}_{i,j,k-1}}{(1-p_{i,d})\mathcal{P}_{i,j,k-1} + (1-p_{i,f})(1-\mathcal{P}_{i,j,k-1})}, & \text{if } O_{i,j,k}=0 \\ \mathcal{P}_{i,j,k-1} & \text{otherwise} \end{cases}$$

(2) Collaborative Information

The purpose of the collaborative information is to enable the USV to adjust the search region based on the position of other USVs, so as to avoid multiple USVs searching the same region repeatedly. Collaborative information is represented by c-map that maps neighbor coordinates within the communication range to a matrix with size of $2R_c \times 2R_c$, and $R_c$ is the communication radius. The collaborative information mapping of the i-th USV at the k-th moment is represented as $C_{i,k}=\{c_{i,k,j} \in R: \|g-a_{i,k}\| \leq R_c\}$, where $c_{i,k,j}$ is a superposition of Gaussian distributions centered on the coordinates of the neighbors.

(3) Obstacle Observation Information

The obstacle observation information serves to enable the USV to avoid local obstacles (excluding other USVs) during the performing of its tasks. The obstacle observation information is represented by obstacle map that maps the coordinates of the obstacle within the obstacle avoidance range of the USV into a matrix with size of $2R_o \times 2R_o$, and $R_o$ is the obstacle avoidance radius. The obstacle map of the i-th USV at the k-th moment is represented as $O_{i,k}=\{o_{i,k,j} \in R: \|a_{i,k}-O_{bstacle}\| \leq R_o\}$.

(4) Collision Avoidance Information

Collision avoidance information serves to keep the USV away from other USVs while performing its tasks. The collision avoidance information is represented by a collision avoidance map that maps the USV coordinates within the collision avoidance range of the USV into a matrix with size of $2R_d \times 2R_d$, and $R_d$ is the collision radius. The collision map of the i-th USV at the k-th moment is represented as $d_{i,k}=\{d_{i,k,j} \in R: \|g-a_{i,k}\| \leq R_d\}$.

Figure 4:
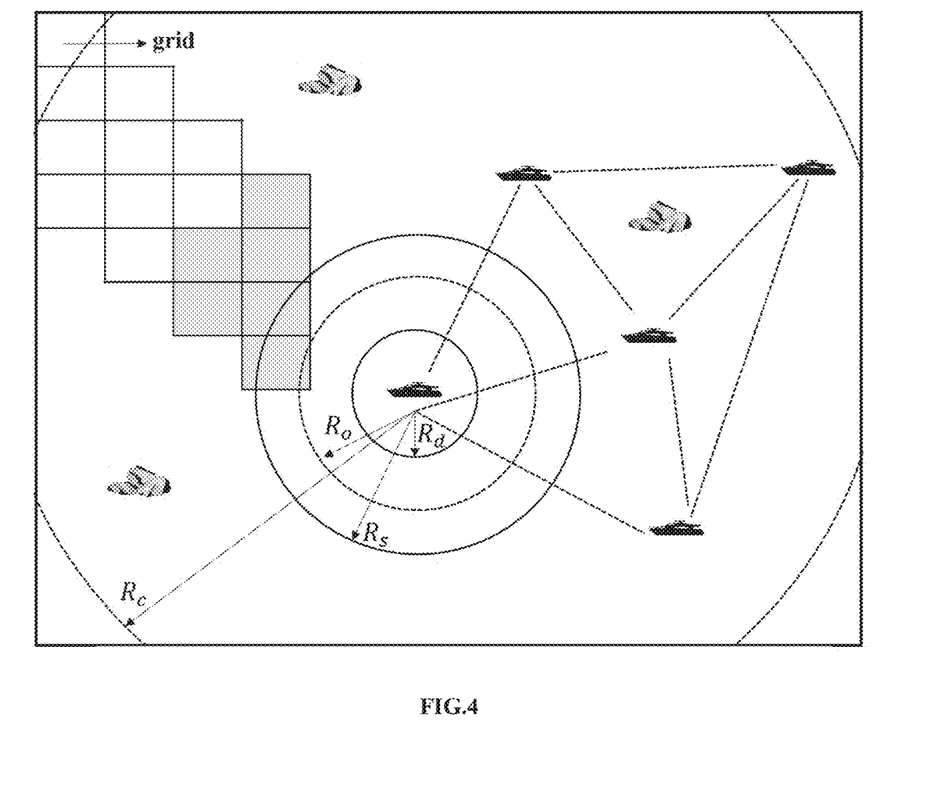
FIG. 4 is an operation schematic diagram of a method for controlling multi-USV collaborative search according to the present disclosure.

In step 2, the environmental perception values collected in the Step 1 are transmitted to a strategy generation step. The strategy generation step is to learn the best strategy. In the search task, on the basis of ensuring the navigation security of the USV, the execution strategy of improving both the target search efficiency and the accuracy of the USV team can be found, as shown in FIG. 4.

The DDQN algorithm is utilized in the strategy generation step. The DDQN algorithm is a classical reinforcement learning algorithm, which is a value-based method and can be easily integrated into the environment. The collected environmental perception values are input into the DDQN algorithm to generate a large amount of sample data which are stored in a replay buffer of DDQN algorithm. When enough sample data are accumulated in the replay buffer, the DDQN algorithm randomly extracts samples from the replay buffer, and the sample data are used for learning strategies to obtain the trained DDQN algorithm.

In step 3, the environmental perception value collected by the i-th USV at the k-th moment is obtained and input into the trained DDQN algorithm. The corresponding action value of the i-th USV can be fed back, and then the USV is controlled to search according to the action value.

Compared with the existing collaborative search algorithm, the beneficial effects of the present disclosure are summarized as follows. (1) In the disclosure, the USV team can learn an effective search strategy, and the navigation safety of USV in the process of task execution is ensured while positioning the target within the task range rapidly. (2) Compared with the traditional search algorithm, the search accuracy and efficiency of the present disclosure are higher. (3) The disclosure has the real-time online learning capability, can learn different search strategies according to different task conditions, and greatly improves the task performance capability of the USV team.

In various embodiments, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

Various embodiments of the present specification are described in a progressive manner, and each embodiment focuses on the description that is different from the other embodiments, and the same or similar parts between the various embodiments are referred to with each other. For the system disclosed in the embodiment, since it corresponds to the method disclosed in the embodiment, the description is relatively simple, and the correlation is described with reference to the method part.

In this specification, several embodiments are used for illustration of the principles and implementations of the present disclosure. The description of the above embodiments is used to help understand the method of the present disclosure and the core idea thereof. In addition, those of ordinary skill in the art can make various modifications in terms of specific implementations and scope of application in accordance with the teachings of the present disclosure. In conclusion, the content of the present specification shall not be construed as a limitation to the present disclosure.

What is claimed is:

1. A method for controlling multi-unmanned surface vessel (USV) collaborative search, comprising:
   carrying out following operations by a USV controller comprising a processor and a plurality of target search strategy output models, wherein each target search strategy output model is obtained based on a training of training samples and a double deep Q-network (DDQN) network structure:
      determining a task region of a USV team, wherein the USV team comprises a plurality of USVs, each of the plurality of the USVs corresponds to one target search strategy output model;
      determining environmental perception information corresponding to each of the USVs at a current moment according to the task region and a probability graph mode, wherein the environmental perception information comprises target information, collaboration information, obstacle observation information and collision avoidance information; and
      inputting the environmental perception information corresponding to each of the USVs at the current moment into a corresponding target search strategy output model respectively to obtain an execution action signal of each of the USVs at a next moment; and
   receiving the execution action signal of each of the USVs at the next moment by a corresponding USV execution structure such that the corresponding USV execution structure is controlled to perform an execution action corresponding to the execution action signal for searching for underwater targets in the task region.

2. The method for controlling multi-USV collaborative search of claim 1, wherein the step of determining the environmental perception information corresponding to each of the USVs at the current moment according to the task region and the probability graph mode comprises:
   calculating a task sub-region corresponding to each of the USVs according to the task region and a number of USVs in the USV team; and
   determining the environmental perception information collected by each of the USVs in the corresponding task sub-region at the current moment based on the probability graph mode.

3. The method for controlling multi-USV collaborative search of claim 2, wherein a determining process of the target information comprises:
   establishing an xy coordinate system with one corner of the task sub-region as an origin;
   dividing the task sub-region to obtain a plurality of cells with a same size, and calculating a central position coordinate of each of the cells based on the xy coordinate system;
   determining a target existence probability of each of the cells;
   modelling each of the cells based on the target existence probability of each of the cells by employing a Bernoulli distribution probability algorithm, to obtain a target existence probability model corresponding to each of the cells;
   determining an sensing region of the USV at the current moment;
   calculating a target existence probability graph corresponding to the USV at the current moment according to the central position coordinate of each of the cells, the target existence probability model corresponding to each of the cells and the sensing region of the USV at the current moment; and
   determining the target information corresponding to the USV at the current moment according to the target existence probability graph corresponding to the USV at the current moment.

4. The method for controlling multi-USV collaborative search of claim 3, wherein a determining process of the collaborative information comprises:
   determining the collaborative information corresponding to the USV at the current moment according to the formula $C_{i,k}=\{c_{i,k,j}\in R:\|g-a_{i,k}\|\leq R_c\}$;
   wherein the $C_{i,k}$ represents the collaborative information of an i-th USV at a k-th moment, the $c_{i,k,j}$ represents the collaborative information of the i-th USV in a j-th cell at the k-th moment, the R represents a radius of the task sub-region, the $a_{i,k}$ represents a position of the i-th USV at the k-th moment, the g represents a position of the j-th cell, and the $R_c$ represents a communication radius.

5. The method for controlling multi-USV collaborative search of claim 3, wherein a determining process of the obstacle observation information comprises:
   determining the obstacle observation information corresponding to the USV at the current moment according to the formula $O_{i,k}=\{o_{i,k,j}\in R:\|a_{i,k}-O_{bstacle}\|\leq R_o\}$;
   wherein the $O_{i,k}$ represents the obstacle observation information of an i-th USV at a k-th moment, and the $o_{i,k,j}$ represents the obstacle observation information of the i-th USV in a j-th cell at the k-th moment, the R represents a radius of the task sub-region, the $a_{i,k}$ represents a position of the i-th USV at the k-th moment, the $O_{bstacle}$ represents a position of an obstacle, and the $R_o$ represents an obstacle avoidance radius.

6. The method for controlling multi-USV collaborative search of claim 3, wherein a determining process of the collision avoidance information comprises:
   determining the collision avoidance information corresponding to the USV at the current moment according to the formula $d_{i,k}=\{d_{i,k,j}\in R:\|g-a_{i,k}\|\le R_d\}$;
   wherein the $d_{i,k}$ represents the collision avoidance information of an i-th USV at a k-th moment, and the $d_{i,k,j}$ represents the collision avoidance information of the i-th USV in a j-th cell at the k-th moment, the R represents a radius of the task sub-region, the $a_{i,k}$ represents a position of the i-th USV at the k-th moment, the g represents a position of the j-th cell, and the $R_d$ represents a collision radius.

7. The method for controlling multi-USV collaborative search of claim 1, wherein a construction process of the target search strategy output model comprises:
   determining a training sample for an i-th USV, wherein the training sample is a data set with temporal continuity, the data set comprises a plurality of sample sets, each of the sample sets comprises a plurality of elements, which are respectively the environmental perception information at the current moment, the execution action at the current moment, a reward at the current moment and the environmental perception information at the next moment;
   constructing the DDQN network structure; and
   inputting the training samples of the i-th USV into the DDQN network structure for training the DDQN network structure to obtain the target search strategy output model corresponding to the i-th USV, so as to obtain the target search strategy output model corresponding to each USV.

8. A system for controlling multi-unmanned surface vessels (USV) collaborative search, comprising a processor and a plurality of target search strategy output models, each of which is obtained by training based on a training sample and a double deep Q-network (DDQN) network structure, wherein the system further comprises:
   a task region determination module, configured to determine a task region of a USV team, wherein the USV team comprises a plurality of USVs, each of the plurality of the USVs corresponds to one target search strategy output model;
   an environmental perception information determination module, configured to determine environmental perception information corresponding to each of the USVs at a current moment according to the task region and a probability graph mode, wherein the environmental perception information comprises target information, collaboration information, obstacle observation information and collision avoidance information; and
   an execution action acquisition module, configured to input the environmental perception information corresponding to each of the USVs at the current moment into the corresponding target search strategy output model respectively to obtain an execution action signal of each of the USVs at a next moment;
   wherein the execution action signal of each of the USVs at the next moment is received by a corresponding USV execution structure to such that the corresponding USV execution structure is controlled to perform an execution action corresponding to the execution action signal for searching for underwater targets in the task region.

9. The system for controlling multi-USV collaborative search of claim 8, wherein the environmental perception information determination module comprises:
   a task region dividing unit, configured to calculate a task sub-region corresponding to each of the USVs according to the task region and a number of USVs in the USV team; and
   an environmental perception information determination unit, configured to determine environmental perception information collected by each USV in a corresponding task sub-region at the current moment based on the probability graph mode.

10. The system for controlling multi-USV collaborative search of claim 8, further comprising a target search strategy output model construction module; the target search strategy output model construction module comprises:
    a training sample determination unit, configured to determine a training sample for an i-th USV, the training sample is a data set with temporal continuity, wherein the data set comprises a plurality of sample sets, each of the sample sets comprises a plurality of elements, which are respectively the environmental perception information at the current moment, the execution action at the current moment, a reward at the current moment and the environmental perception information at the next moment;
    a DDQN network structure construction unit, configured to construct the DDQN network structure; and
    a target search strategy output model construction unit, configured to input the training sample of the i-th USV into the DDQN network structure for training the DDQN network structure to obtain the target search strategy output model corresponding to the i-th USV, so as to obtain the target search strategy output model corresponding to each of the USVs.

* * * * *